INVENTOR.
Nicholas V. Ross
BY
ATTORNEY.

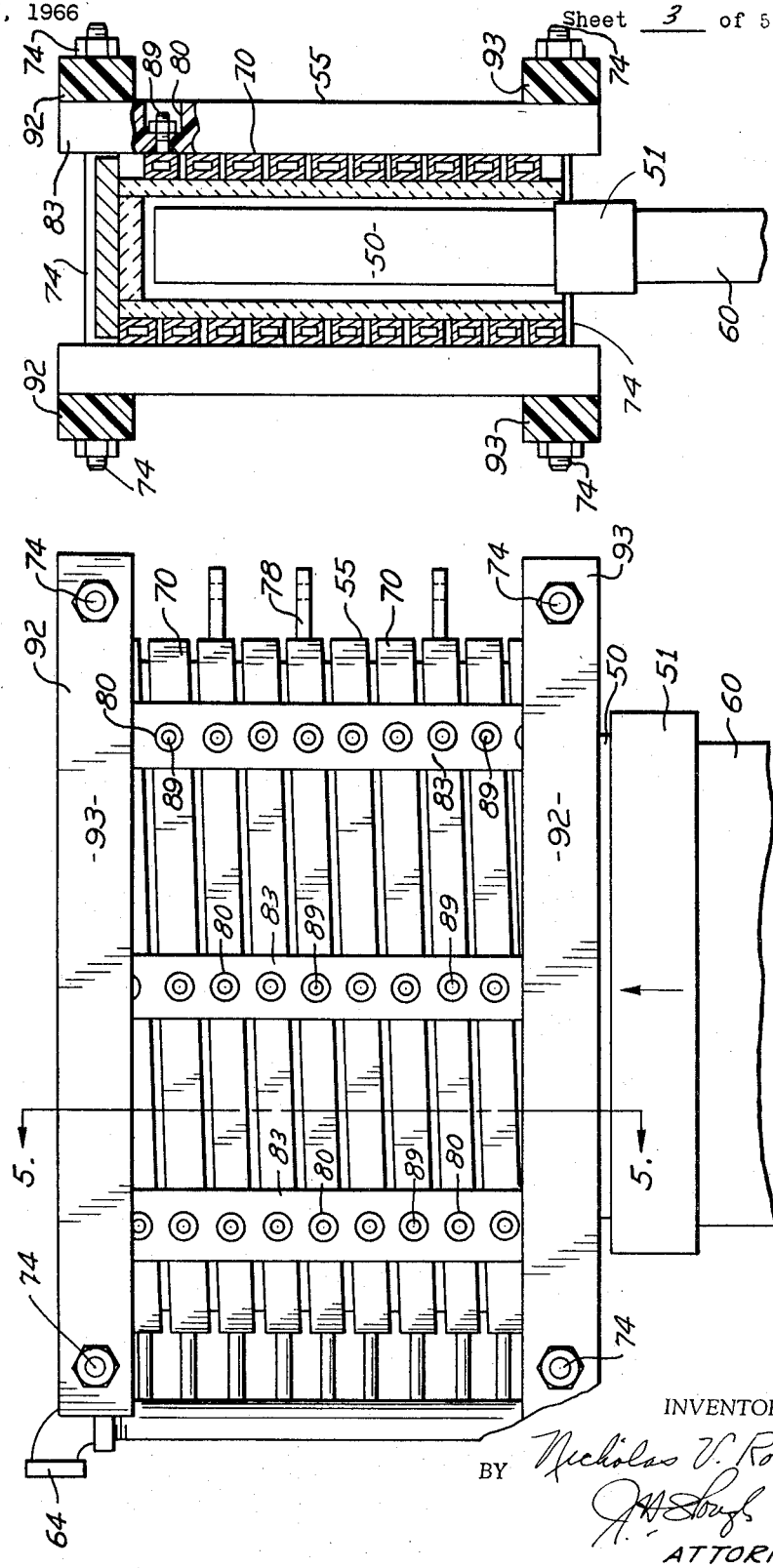

United States Patent Office  3,424,886
Patented Jan. 28, 1969

3,424,886
INDUCTION HEATING
Nicholas V. Ross, Youngstown, Ohio, assignor to Ajax Magnethermic Corporation, Warren, Ohio, a corporation of Ohio
Filed Oct. 27, 1966, Ser. No. 589,974
U.S. Cl. 219—10.79                                    9 Claims
Int. Cl. H05b 9/02

ABSTRACT OF THE DISCLOSURE

There is disclosed herein an induction heating coil for statically heating parallelepiped metal slabs or the like wherein the magnetic field throughout said slabs is disposed at substantially right angles to the longest and shortest dimension of the slab, etc.

---

This invention relates to improvements in induction heating and relates more particularly to improvements in induction statically heating devices for heating metals; such as, steel billets, ingots, slabs, bars, or like ferrous or non-ferrous metals.

A further object is to provide an improved construction and shape of inductor coil for induction furnaces.

In induction heating units of the through-feed or continuous type as shown in U.S. Letters Patent to Lackner et al., No. 2,676,234, dated Apr. 20, 1954, water cooled inductor coils connected to power leads are disclosed helically wound in contiguous lateral relation forming end-to-end a generally cylindrical open ended tube through which metal billets or other workpieces pass in a longitudinal direction, the billets or workpieces having a major portion of their length generally disposed in the longitudinal direction of the helical coil.

The present invention provides an inductor wherein metal objects to be inductively heated therein are oriented within a coil so disposed about the workpieces that they are substantially disposed within the inductor with their portions of greater length disposed perpendicular to the direction of the magnetic field within the coil.

The inductor of this invention is capable of handling a large production with improved mechanical handling and greater efficiency and is able to inductively heat any type of ferrous or non-ferrous metal to be heated whether these be billets, bars, rounds, slabs, or any shape, thus avoiding the necessity of special coils for different shaped loads. The invention also provides more uniform heating and a greater electrical efficiency.

The present invention is particularly adapted for induction heating of slabs of considerable length, for example, slabs from ten to twenty feet in length; if such slabs are heated in a longitudinal direction in the conventional solenoid induction coil, several or more coils would be required to be aligned to heat the same with resultant gaps in heating between the coil sections. Continuous movement of such slabs through such coils could be resorted to but the length of such a line would be prohibitive. According to the present invention, such slabs may be heated by a single coil and adjustment means provided for the coil whereby the same could be adjusted to handle slabs of differing thickness with resulting economies and efficiency.

Other objects of my invention and the invention itself will become more readily apparent from the following description of the invention, illustrated in the accompanying drawings.

FIGURE 4 is a top view of a modified inductor disclosing the workpiece being vertically reciprocally moved in the inductor;

FIGURE 5 is a sectional view taken on line 5—5 of FIGURE 4;

Figure 1:
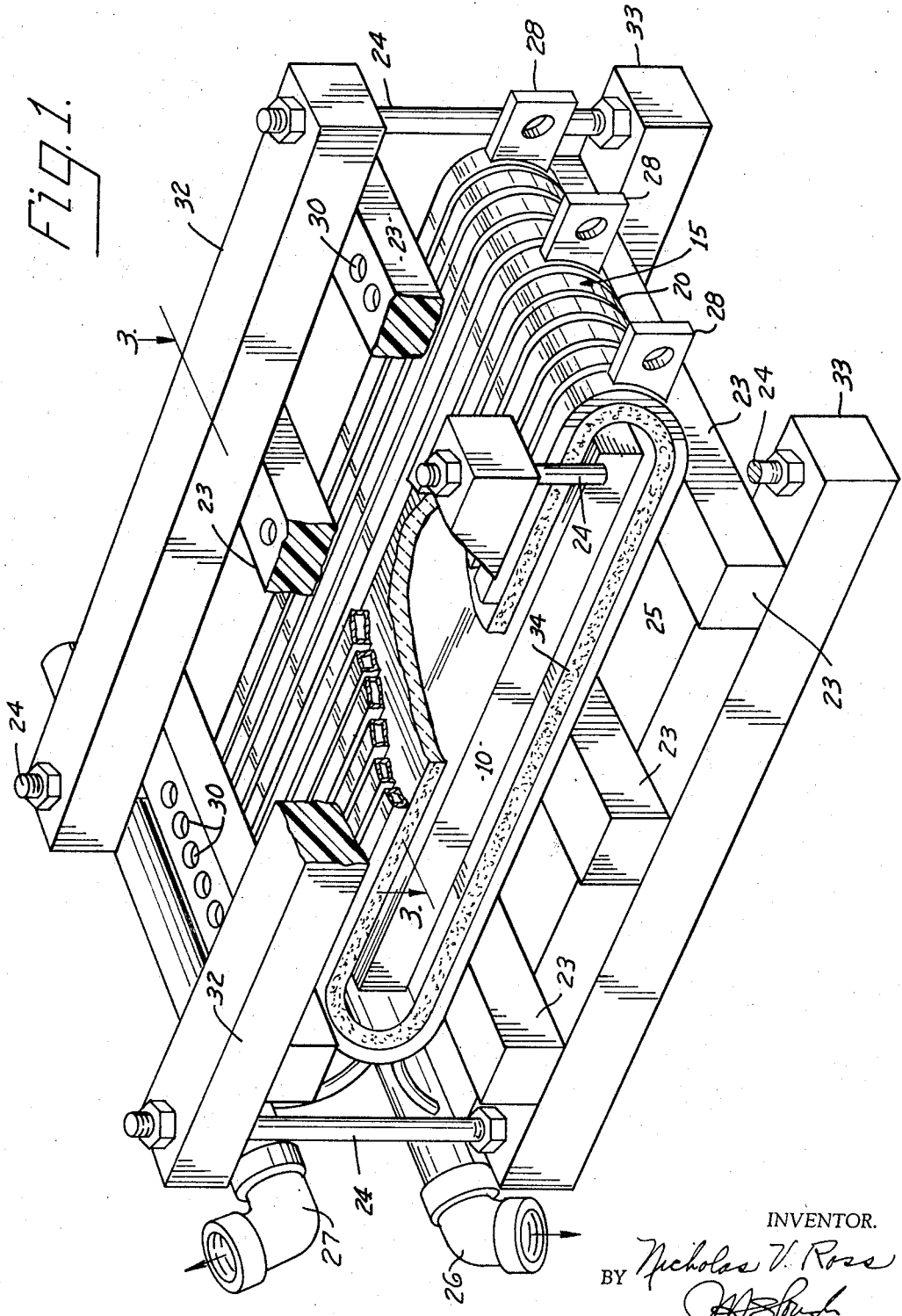
FIGURE 1 is a perspective view of an embodiment of the inductor of my invention, certain parts being cut away for clarity.

Referring now to the drawings, in all of which like parts are designated by like reference characters, in FIGURE 1 a typical slab 10 or workpiece is shown passing through an open end tubular inductor 15, said inductor comprising a substantially flat generally rectangular in cross section helical wound conductor 20 having a number of turns therein formed of copper tubing or other conductive material; the turns of the tubing or conductor 20 being supported in turn-spaced insulated relation. The inductor 15 may be a single-turn coil or multi-turn coil. Said coil may be connected either in series or in parallel to a source of alternating power supply either multi-phase or single phase.

Figure 3:
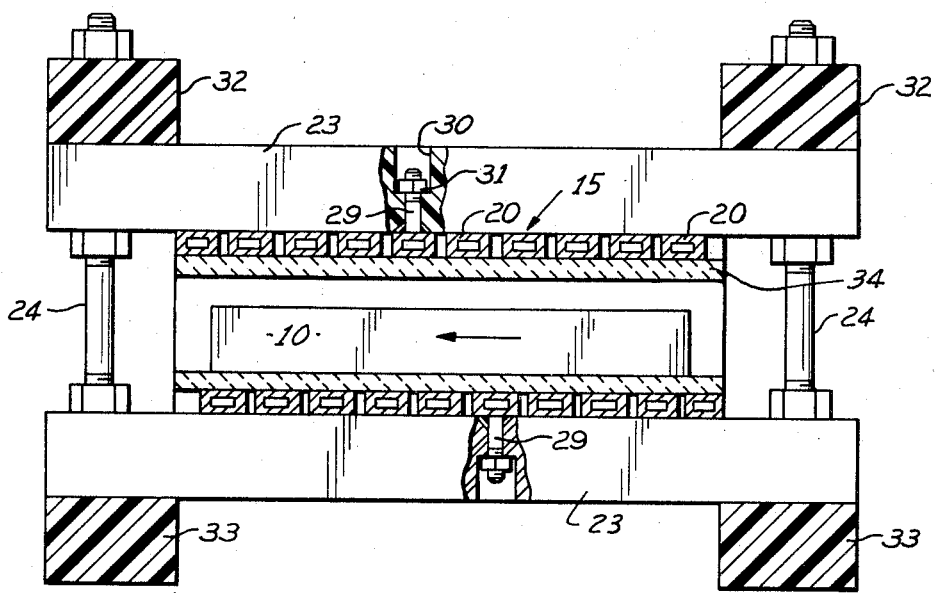
FIGURE 3 is a sectional view taken on lines 3—3 of FIGURE 1; an arrow designating the direction of workpiece passage.
Figure 8:
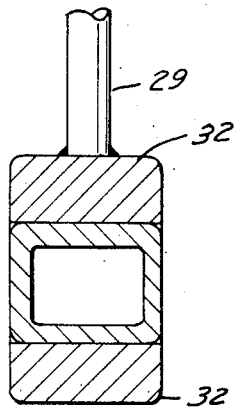
FIGURE 8 is a sectional view of a conductor used in the inductor of the invention.
Figure 9:
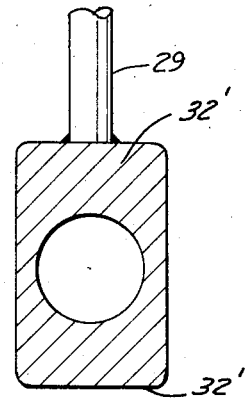
FIGURE 9 is a sectional view of a modification of the conductor.
Figure 10:
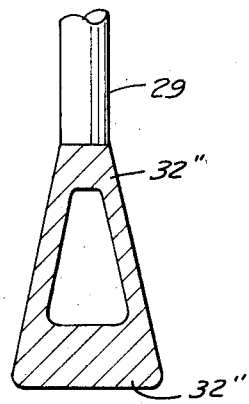
FIGURE 10 is a sectional view of a still further modification of the conductor used in the inductor of the invention.

As shown in FIGURE 1, 3 and 8, the conductor is rectangular in cross-section but, as illustrated in FIGURES 9 and 10 the inner and/or outer shape thereof may be varied. The tubular conductor 20 is preferably, as best illustrated in FIGURES 8, 9 and 10, provided with integrally secured or integrally formed, preferably, relatively thickened opposite wall portions 32, 32′, 32″, wherefor the coil is a rigid structure having relatively rigid bar characteristics adapted to be securely fastened to supports therefor to secure mechanical stability thereof.

Figure 2:
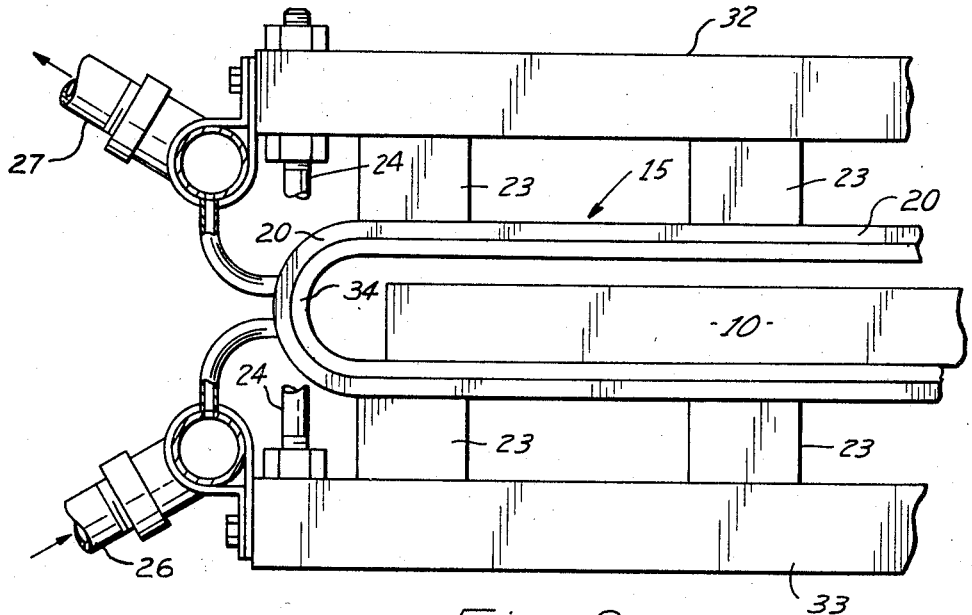
FIGURE 2 is an end view of a part of the inductor of FIGURE 1 showing water inlet and outlet means.

The conductor being formed of tubing is preferably water cooled and water or other cooling medium is adapted to be passed therethrough entering in the form of FIGURE 2 through an inlet 26 and leaving through a fluid outlet 27. Power is supplied through connecting bars or coil taps 28 preferably welded to form an integral connection to the conductors.

As shown in FIGURE 3, stud bolts 29 are adapted to adjustably secure the coil conductor 20 to studboards 23, the bolts being secured as by welding to the thickened wall 32, 32′, 32″ (see FIGURES 8 to 10) of the conductor and passing through openings 30 in the studboards; a hexagonal nut 31 and lock washers (not shown) securely retaining the conductor in its preselected spaced-turn mounted position. Structural cross beams 33 are preferably adjustably connected by the tie bars 24 to cross beam members 133 and act as supports for the studboard members 23 to reduce the effect of vibrational forces.

The inductor coil is preferably provided as shown with a liner 34 of insulating refractory material or, for example, stainless steel of high temperature resistance and relatively high electrical resistivity and insulating material and it will be understood that rails, if desired, may be employed in the coil for passage of the workpiece, slab, etc. thereover. If refractory material is employed, I contemplate the provision of reinforcing preferably water cooled rods therein (not shown).

It is to be noted that the coil 15 is disposed with respect to the workpiece in a direction whereby heating current is supplied from end-to-end of the workpiece or load disposed therein (see FIGURE 12), the direction of the current shown by arrows X. The direction of the magnetic field is shown by arrows Y at substantial right angles to the longitudinal axis of the workpiece.

Figure 11:
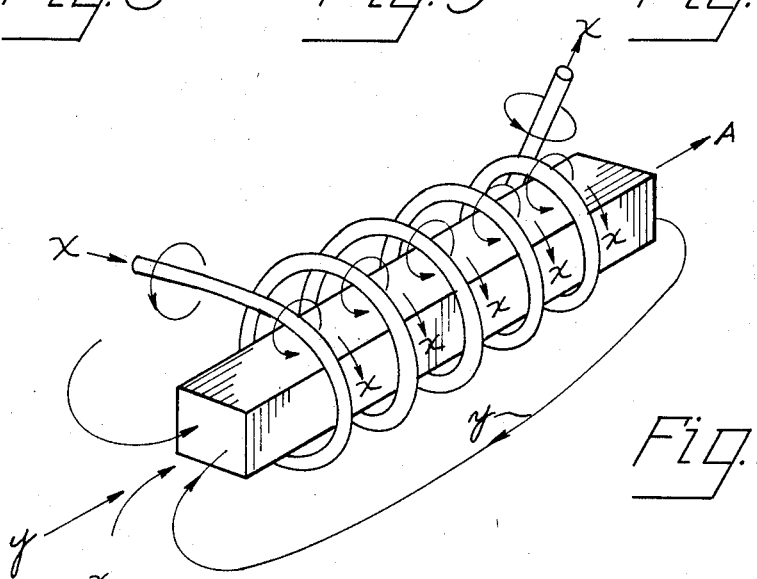
FIGURE 11 is a view showing a workpiece passing through a conventional helical inductor coil and showing the direction of the workpiece and of the magnetic field passing through the longitudinal axis thereof.
Figure 12:
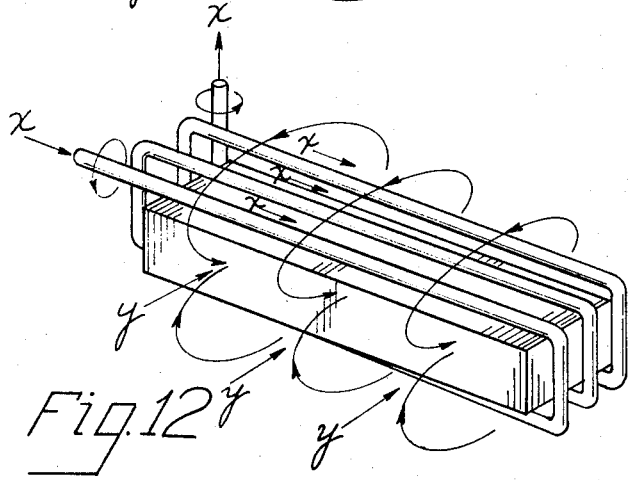
FIGURE 12 is a view showing an induction coil according to the invention having a workpiece positioned therein with the magnetic field disposed perpendicular to the longitudinal axis of the workpiece; said view further indicating the direction of movement of the workpiece.

FIGURE 11 illustrates in contrast thereto the conventional helical conductor coil of the prior art, the workpiece direction, magnetic field direction and current flow and similar indicia to that of FIGURE 12 is used therein.

Magnetic yokes and spacer members (not shown) are adapted in the forms of my invention to be disposed on the cross member on both sides of the coil and along the coil length and are employed where high magnetic forces are a factor as in low frequency installation acting to minimize stray heating of the supporting structure.

In the form of my invention shown in FIGURES 4 and 5, a slab 50 seated on an insulated plate 51 is vertically elevated and lowered as by hydraulic means 60 into an inductor surrounding portion where it is statically heated, as shown in FIGURE 5; the inductor 55 comprises a preferably flat rectangular cross-section helically wound conductor 70 secured, similarly to the form of FIGURE 1, by rigid framing comprising studboards 83, stud bolts 89, yoke cross beams 92, 93 and tie bars 74. Water inlet and outlet means 64 are similarly provided for coil cooling. Power is supplied through connecting bars 78 to the coil and the slab as shown is disposed on edge, the width becoming the height or vertical dimension shown in FIGURE 5, the length of the slab disposed in the direction of the relatively longer conductor turn portions, as shown in FIGURE 4. The coil convolutions are preferably rectangular in cross-section and provided with flattened thickened wall portions as in the form of FIGURE 1. The inductor of FIGURES 4 and 5 either may be laid on the existing floor level wherefor the slab may be raised into and out of the heater or the inductor may be laid over an excavation in the floor and the hydraulic hoist mounted therein.

Figure 6:
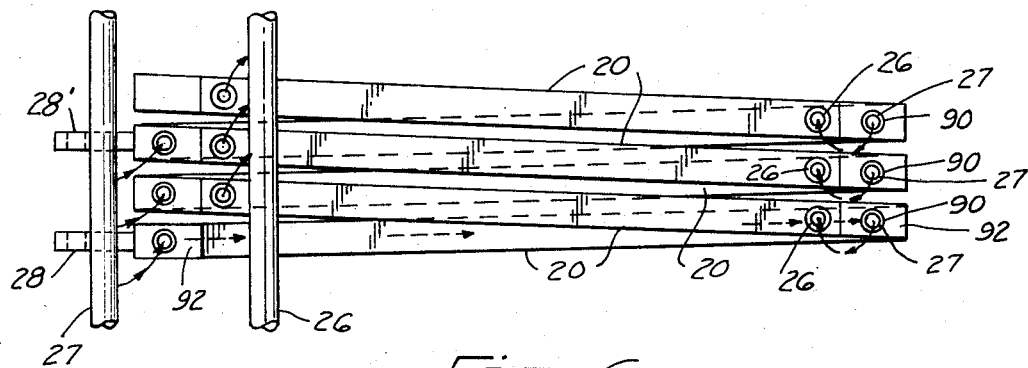
FIGURE 6 is a top view of the inductor with adjustability.
Figure 7:
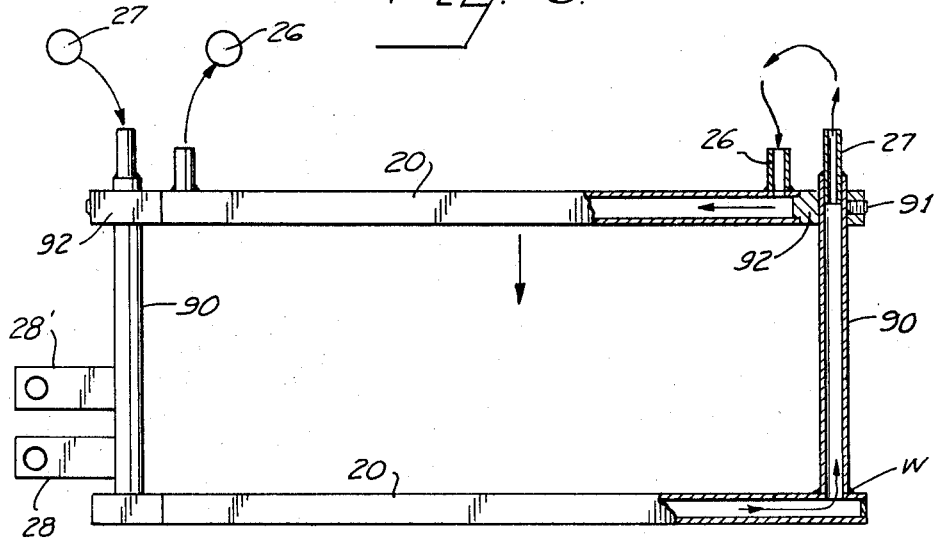
FIGURE 7 is a plan view of the adjustable inductor shown in FIGURE 6.

In FIGURES 6 and 7, I have disclosed a modification of the inductor of my invention providing close coupling for the load and adjustment means for compensating for differences in thickness of load. As shown, a plurality of tubular end conductors 90 are integrally secured as by welding (indicated at W) at one end to longitudinally disposed conductors 20 and adjustably as by set screws 91 or other locking means at an opposite end by an end plug 92 to a longitudinal conductor 20 spaced from said first recited longitudinal conductor. Power leads and fluid inlet and outlet means are indicated at 28, 28' and 26 and 27 respectively. It will be understood that the terminal is of conductive material; the tubes are water cooled. The adjustment of such means compensates for variations in the thickness of the load, as may be required. Since the top conductor is adjustable, only one coil need be supplied for a range of slab thickness. It will be noted that the end conductors complete the adjustable rectangle while maintaining close proximity of all portions of the rectangle, i.e. longitudinal and end conductors, to the load to provide maximum efficiency, maximum power factor, and minimum volts per turn, regardless of load thickness.

While I have described my invention in connection with a preferred embodiment therein, it is to be understood that various changes may be made therefrom without, however, departing from the spirit of my invention or the scope of the appended claims.

What I claim is:

1. An induction coil for uniformly and statically heating a parallelepiped metal slab, said coil comprising a number of turns substantially rectagular in form and completely surrounding the said slab, an alternating current power source energizing said coil, each of said turns comprising two longitudinally disposed relatively long straight conductors and two relatively short end conductors, said relatively long conductors being disposed in a direction parallel to the longest dimension of the slab disposed wholly within said induction coil, the magnetic field throughout said slab being disposed at substantially right angles to the longest dimension and to the shortest dimension of the slab.

2. An induction coil for heating a metal slab as claimed in claim 1 wherein said end conductors are secured to said longitudinally disposed straight conductor by an adjustable connection at at least one of each of the said end conductors, providing close magnetic coupling of longitudinal and end conductors to the load.

3. An induction coil for heating a metal slab as claimed in claim 1 having a frame structure supporting said conductor, said frame structure being secured to portions of said longitudinally extending conductor.

4. An induction coil as claimed in claim 1 wherein the coil is disposed with respect to the metal slab heated thereby in a direction whereby current is supplied from end-to-end of the slab.

5. An induction coil for heating a metal slab as claimed in claim 1 wherein said conductor is tubular and is provided with opposite integral wall portions relatively thickened on the slab adjacent side and on the side opposite thereto to which a supporting frame is secured.

6. An induction coil as claimed in claim 1 having substantially rigid bar characteristics.

7. An induction coil for uniformly and statically heating a parallelepiped metal slab as claimed in claim 1, said coil being adjustable for a change in the shortest dimension of said slab, wherein all said longitudinally disposed conductors and said short end conductors are rigid and tubular and adapted for water cooling, and wherein each said end conductor at at least one end thereof is secured to one end of one of said longitudinally disposed conductors by means of an adjustable sliding connection, each said adjustable connection remaining substantially within and not extending beyond the width of said longitudinally disposed conductor, all said adjustable connections being adjusted to maintain all longitudinally disposed conductors substantially in two parallel planes and to vary the distance therebetween, providing close magnetic coupling to the slab.

8. An induction coil for uniformly and statically heating a parallelepiped metal slab, said coil comprising a number of turns being substantially rectangular in form and completely surrounding the said slab, said slab being disposed on edge within said rectangular coil and alternating current power source energizing said coil, each of said turns comprising two longitudinally disposed relatively long straight conductors and two relatively short end conductors, said slab having its longest dimension parallel to said relatively long conductors and the ends of said slabs beind disposed parallel with the relatively short end conductors, the magnetic field throughout said slab being disposed at substantially right angles to the longest dimension of said slab and to the shortest dimension of the said slab.

9. An induction coil for statically heating a parallelepiped metal slab, said coil being substantially rectangular in form and completely surrounding the said slab and alternating current power source energizing the said coil, said coil comprising longitudinally disposed relatively long conductors and relatively short end conductors; said slab being disposed with its longest dimension in a direction parallel to the longitudinally disposed relatively long conductors and having its ends disposed in a direction parallel to the relatively short end conductors, said slab being disposed on edge in said induction coil, slab support means disposed externally of said coil, said relatively long conductors having opposite integral wall portions relatively thickened on the slab adjacent side and on the side opposite thereto, said supporting frame secured to said opposite thickened sides of said long conductors.

References Cited

UNITED STATES PATENTS

| | | | | |
|---|---|---|---|---|
| 1,861,869 | 6/1932 | Long | 219—10.79 | X |
| 2,465,306 | 3/1949 | Durand | 219—10.71 | X |
| 3,041,434 | 6/1962 | Alf | 219—10.79 | X |
| 3,249,406 | 5/1966 | Crosby et al. | 219—10.79 | X |

FOREIGN PATENTS 905,045 11/1945 France.

OTHER REFERENCES

Siemens-Schuckertverke, German application 1,186,569, printed Feb. 4, 1965.

RICHARD M. WOOD, *Primary Examiner.*

L. H. BENDER, *Assistant Examiner.*

U.S. Cl. X.R.

219—10.67, 10.69, 10.71